United States Patent

Fukuoka et al.

[11] Patent Number: 5,844,737
[45] Date of Patent: Dec. 1, 1998

[54] REPRODUCING APPARATUS WITH DIFFERENT REPRODUCTION DATA FOR NORMAL AND SEARCH MODES WHICH SCANS TWO AREAS OF A SPLIT TAPE RECORDING MEDIUM IN OPPOSITE DIRECTIONS

[75] Inventors: Hiroyuki Fukuoka; Koji Takahashi, both of Kanagawa, Japan

[73] Assignee: Canon Kabushiki Kaisha, Tokyo, Japan

[21] Appl. No.: 371,598

[22] Filed: Jan. 12, 1995

Related U.S. Application Data

[63] Continuation of Ser. No. 192,189, Feb. 4, 1994, abandoned, which is a continuation of Ser. No. 792,465, Nov. 13, 1991, abandoned.

[30] Foreign Application Priority Data

Nov. 14, 1990 [JP] Japan ................................ 2-308065
Dec. 6, 1990 [JP] Japan ................................ 2-400674

[51] Int. Cl.$^6$ ............................................... G11B 5/02
[52] U.S. Cl. ............................. 360/18; 360/22; 386/69
[58] Field of Search ........................... 360/84, 9.1, 10.1, 360/10.3, 22, 23, 24, 25, 51, 10.2, 77.13, 18, 20; 386/68, 69, 81

[56] References Cited

U.S. PATENT DOCUMENTS

| | | | |
|---|---|---|---|
| 4,551,840 | 11/1985 | Fujii et al. | 360/53 |
| 4,617,599 | 10/1986 | Noguchi et al. | 360/51 |
| 4,688,115 | 8/1987 | Takahashi et al. | 360/74.1 |
| 4,731,839 | 3/1988 | Goray et al. | 380/14 |
| 4,737,866 | 4/1988 | Ebata | 360/51 |
| 4,745,486 | 5/1988 | Ohira et al. | 360/70 X |
| 4,843,485 | 6/1989 | Reitmeier | 360/9.1 |
| 4,885,458 | 12/1989 | Horiguchi et al. | 360/2 |
| 4,899,147 | 2/1990 | Schiavo et al. | 341/60 |
| 4,930,024 | 5/1990 | Kanda et al. | 360/10.3 |
| 5,051,848 | 9/1991 | Ishii et al. | 360/32 |
| 5,065,261 | 11/1991 | Hughes et al. | 360/77.13 X |
| 5,072,316 | 12/1991 | Kubota et al. | 360/70 |
| 5,136,391 | 8/1992 | Minami | 36/23 X |
| 5,289,324 | 2/1994 | Katoku et al. | 36/96.5 |

Primary Examiner—Aristotelis M. Psitos
Assistant Examiner—Larry T. Cullen
Attorney, Agent, or Firm—Robin, Blecker & Daley

[57] ABSTRACT

A reproducing apparatus for a tape-shaped recording medium having two channels recorded in forward and backward directions, respectively. The reproducing apparatus is arranged to cause a reproducing head to scan concurrently regions which respectively include the two channels, reproduce data in the forward and backward directions at a time, and convert the backward-reproduced data into forward data through writing and reading to and from a memory.

5 Claims, 7 Drawing Sheets

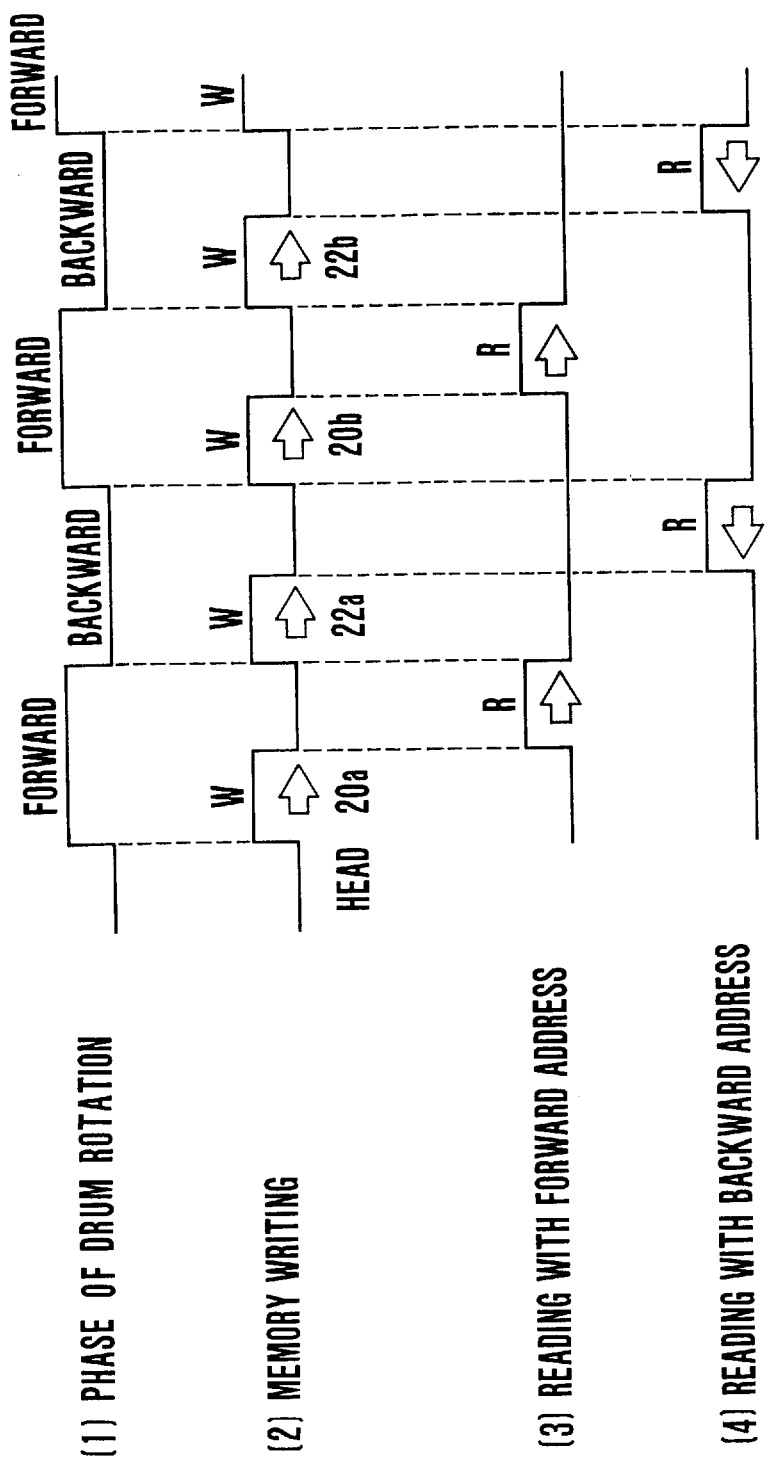

REPRODUCING APPARATUS WITH DIFFERENT REPRODUCTION DATA FOR NORMAL AND SEARCH MODES WHICH SCANS TWO AREAS OF A SPLIT TAPE RECORDING MEDIUM IN OPPOSITE DIRECTIONS

This is continuation of prior application Ser. No. 08/192,189 filed Feb. 4, 1994, now abandoned, which is a continuation of Ser. No. 07/792,465 filed Nov. 13, 1991, now abandoned.

BACKGROUND OF THE INVENTION

1. Field of the Invention

The present invention relates to a reproducing apparatus and, more particularly, to a reproducing apparatus for reproducing information recorded on two channels on a tape-shaped recording medium.

2. Description of the Related Art

A two-channel recording system is known in the field of audio tape recorders. The two-channel recording system is arranged to record information on a path extending along one edge of a magnetic tape and also to record information on a path extending along the other edge with a tape cassette which accommodates the magnetic tape placed upside down. It is considered that such a two-channel recording system is applied to a helical-scan type of recording and reproducing system for use in video tape recorders.

It is also proposed to realize miniaturization of the apparatus and/or extension of the recording time thereof by recording information on two channels with high density in forward and backward directions in the above-described manner.

If information, such as digital image data, recorded on two channels of a magnetic tape in the forward and backward directions is to be reproduced by a conventional arrangement, there are the problems that it is necessary to reproduce each of the two channels individually and that since the magnetic tape is a sequential access medium, searching takes a long time.

SUMMARY OF THE INVENTION

It is, therefore, an object of the present invention to provide a reproducing apparatus capable of reproducing two channels concurrently and of searching recorded information extremely rapidly.

To achieve the above object, according to a first aspect of the present invention, there is provided a reproducing apparatus for a tape-shaped recording medium having two channels recorded in forward and backward directions, respectively. The reproducing apparatus is arranged to cause a reproducing head to scan concurrently regions which respectively include the two channels, reproduce data in forward and backward directions at a time, and convert the backward-reproduced data into forward data through writing and reading to and from memory means.

With the reproducing apparatus according to the first aspect, it is possible to reproduce, at a time, information recorded on two channels.

According to another aspect of the present invention, there is provided a reproducing apparatus for a recording system arranged to form a plurality of areas on a tape-shaped recording medium along a tape width thereof and record information data in a predetermined area of the areas which corresponds to the direction of tape travel. The reproducing apparatus includes a predetermined number of magnetic heads for reproducing the information data in the same direction as a direction in which the information data has been recorded, and a predetermined number of magnetic heads for reproducing the information data in a direction opposite to the direction in which the information data has been recorded.

With the reproducing apparatus according to the second aspect, it is possible to reproduce data as available data from a region in which the data are recorded in an array corresponding to a direction opposite to the direction of tape travel for reproduction. Accordingly, since recorded contents can be searched without the need to reverse the direction of tape travel, the speed of search can be improved.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 9 is a timing chart showing the operation of the reproducing circuit of FIG. 8 during search.

DETAILED DESCRIPTION OF THE PREFERRED EMBODIMENTS

Preferred embodiments of the present invention will be described below with reference to the accompanying drawings.

Figure 1:
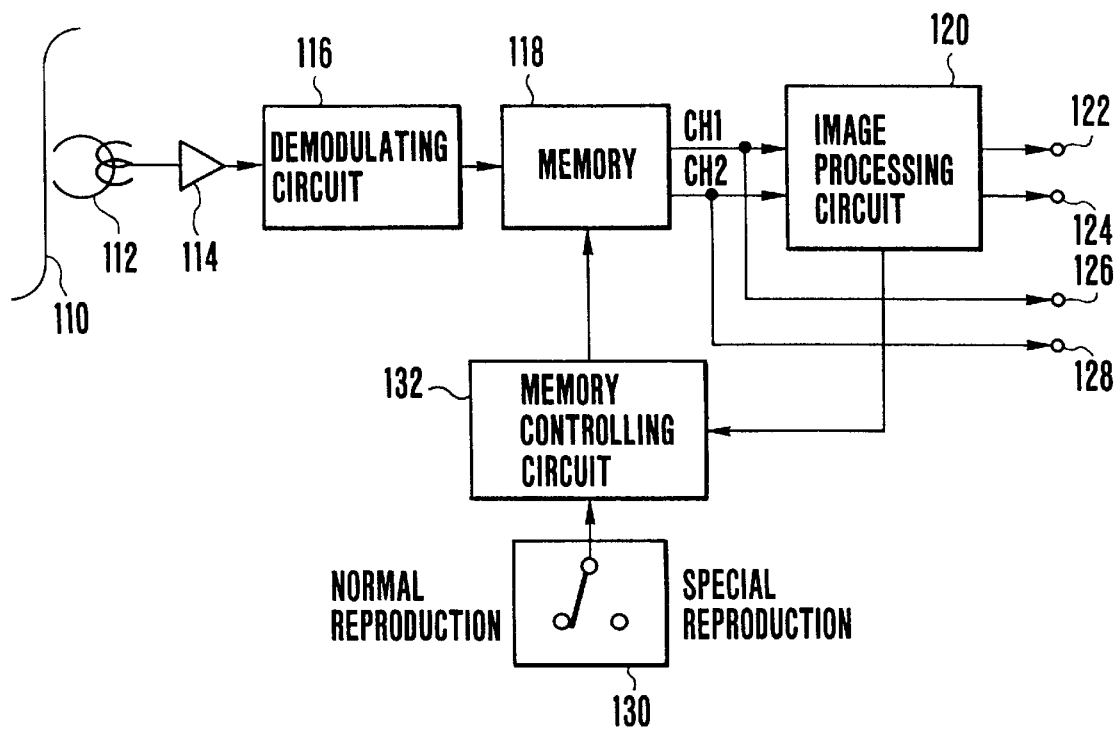
FIG. 1 is a schematic block diagram showing the construction of a first embodiment of the present invention.
Figure 2:
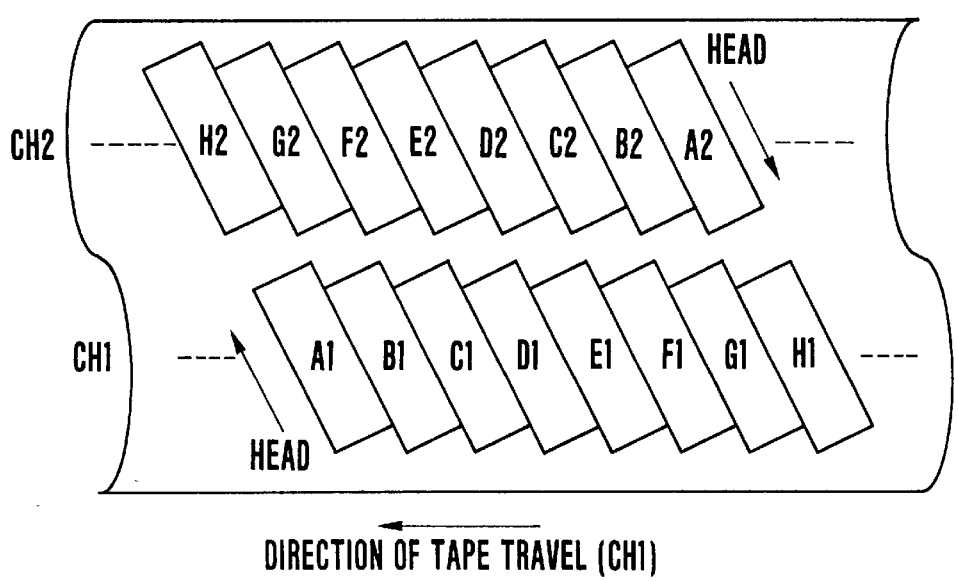
FIG. 2 is a schematic illustration showing track patterns on a magnetic tape which are reproduced according to the first embodiment.

FIG. 1 is a schematic block diagram showing the circuit arrangement of a first embodiment of the present invention. FIG. 2 is a schematic illustration showing track patterns on a magnetic tape. In FIG. 2, A1, B1, C1, D1, . . . represent track patterns of a channel 1 (CH1), and A2, B2, C2, D2, . . . represent track patterns of a channel 2 (CH2). The channel 1 is recorded sequentially from left to right, while the channel 2 is recorded sequentially from right to left, as viewed in FIG. 2. When data is to be reproduced from a magnetic tape which has two channels recorded as shown in FIG. 2, if the direction in which a head scans a track during reproduction is the same as the direction of head scan during recording, reproduction is performed in a positive direction in time. If the direction of head scan during reproduction is opposite to the direction of head scan during recording, reproduction is performed in a negative (backward) direction in time. Accordingly, if the range of head scan is expanded to cover both the CH1 and the CH2, one of the CH1 and the CH2 is reproduced in the positive direction and the other, in the negative direction.

The circuit arrangement shown in FIG. 1 will be explained below. A magnetic tape 110 has two channels on which information data or digital image data are recorded as shown in FIG. 2. The circuit arrangement of FIG. 1 includes a reproducing head 112, a head amplifier 114, a demodulating circuit 116, a memory 118, an image processing circuit 120 for converting CH1- and CH2-reproduced data read from the memory 118 into image signals and outputting them, a first image signal output terminal 122, a second image signal output terminal 124, an output terminal 126 for outputting the CH1-reproduced data read from the memory 118, an output terminal 128 for outputting the CH2-reproduced data read from the memory 118, a mode switch 130 for specifying a desired reproduction mode such as "normal reproduction" or "special reproduction", and a memory controlling circuit 132 for controlling the memory 118 in accordance with a mode specified by the mode switch 130.

The operation of the circuit arrangement of FIG. 1 during normal reproduction will be described below. It is assumed here that the data recorded on the CH1 can be reproduced in the positive direction while the data recorded on the CH2 are being reproduced in the negative direction. The magnetic head 112 scans the entire width of the magnetic tape 110, and the output of the magnetic head 112 is amplified by the head amplifier 114 and demodulated by the demodulating circuit 116. The output of the demodulating circuit 116 is written into the memory 118.

The image processing circuit 120 controls the memory 118 through the memory controlling circuit 132 so that the data of the CH1 is read from the memory 118 in the same order as when the data was written thereinto and so that the data of the CH2 is converted into data arranged in the positive direction and read from the memory 118 in that order. As a matter of course, during the writing of the data into the memory 118 in the negative direction, associated write addresses may be changed in a direction opposite to the direction of normal address change for writing, and during the reading of the data written in the negative direction, associated read addresses may be changed in the same direction as that of address change for the CH1 data.

With the above-described memory reading operation, image data from both the CH1 and the CH2 are inputted into the image processing circuit 120 in the positive direction, and are converted into individual image signals by known processing. The image data reproduced from the CH1 is outputted through the output terminal 122 as a still image signal or a motion image signal, while the image data reproduced from the CH2 is outputted through the output terminal 124 as a still image signal or a motion image signal. The reproduced data from the CH1 and the CH2 are respectively outputted through the output terminals 126 and 128.

An operation for special reproduction, such as "search", "slow" or "still", is explained below. When the special reproduction is to be performed, the special reproduction is specified by using the mode switch 130. The special reproduction has two different sequences, a control sequence for causing the magnetic head 112 to scan one whole track and a control sequence for causing the magnetic head 112 to scan a multiplicity of tracks at a time.

If the magnetic head 112 scans one whole track, one pair of tracks which are positioned along one straight line running across the CH1 and the CH2 is scanned at a time, and an operation similar to that performed in the normal reproduction is carried out. Specifically, reproduced data in the negative direction (the reproduced data of the CH2) is converted into data arranged in the positive direction through writing and reading to and from the memory 118, and is then converted into image signals by the image processing circuit 120. The image signals are outputted through the output terminals 122 and 124.

If the magnetic head 112 scans a plurality of tracks at a time, it scans the magnetic tape 110 until the amount of image data which can constitute one picture is stored in the memory 118. Thus, if the required amount of image data is written into the memory 118, as in the case of the normal reproduction, the data in the positive direction is subsequently read from the memory 118 in that order, while the data in the negative direction is converted into data arranged in the positive direction and read from the memory 118 in that order. The read data are subjected to image processing in the image processing circuit 120 and are then outputted through the output terminals 122 and 124 as still image signals. By repeating the above-described writing and reading to and from the memory 118, the reproduced image signals are outputted through the output terminals 122 and 124.

In the above-described embodiment, the reproduced image from the CH1 is outputted through the output terminal 122 and the reproduced image from the CH2, through the output terminal 124. Of course, the reproduced images from the CH1 and the CH2 may be combined into one picture and this picture may be outputted.

As is readily understood from the foregoing description, according to the first embodiment, it is possible to reproduce concurrently information, respectively, recorded on two channels in the forward and backward directions.

A second embodiment of the present invention will be described below with reference to FIGS. 3 to 9.

Figure 3:
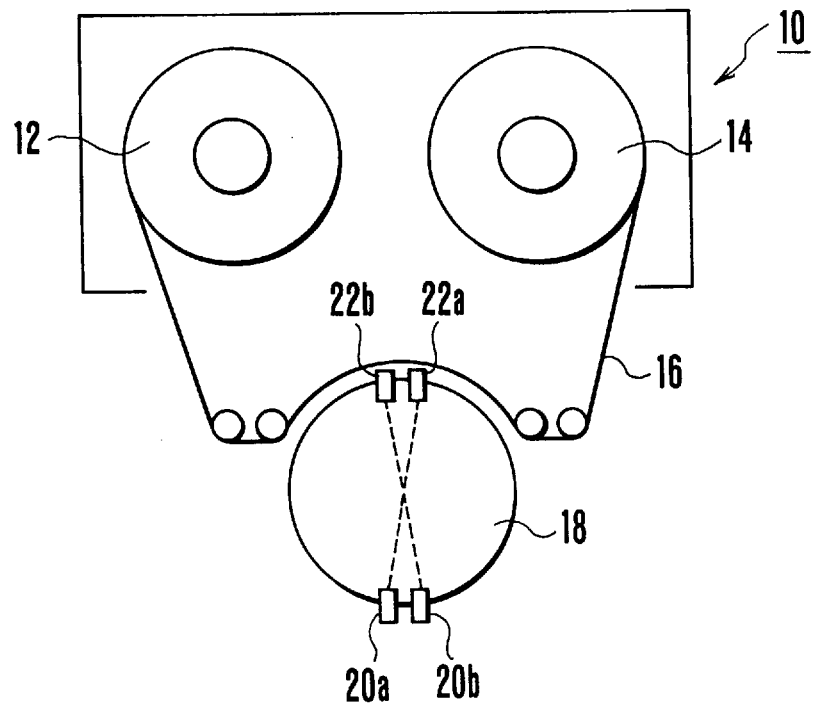
FIG. 3 is a schematic plan view showing a rotary head system according to a second embodiment of the present invention.
Figure 4:
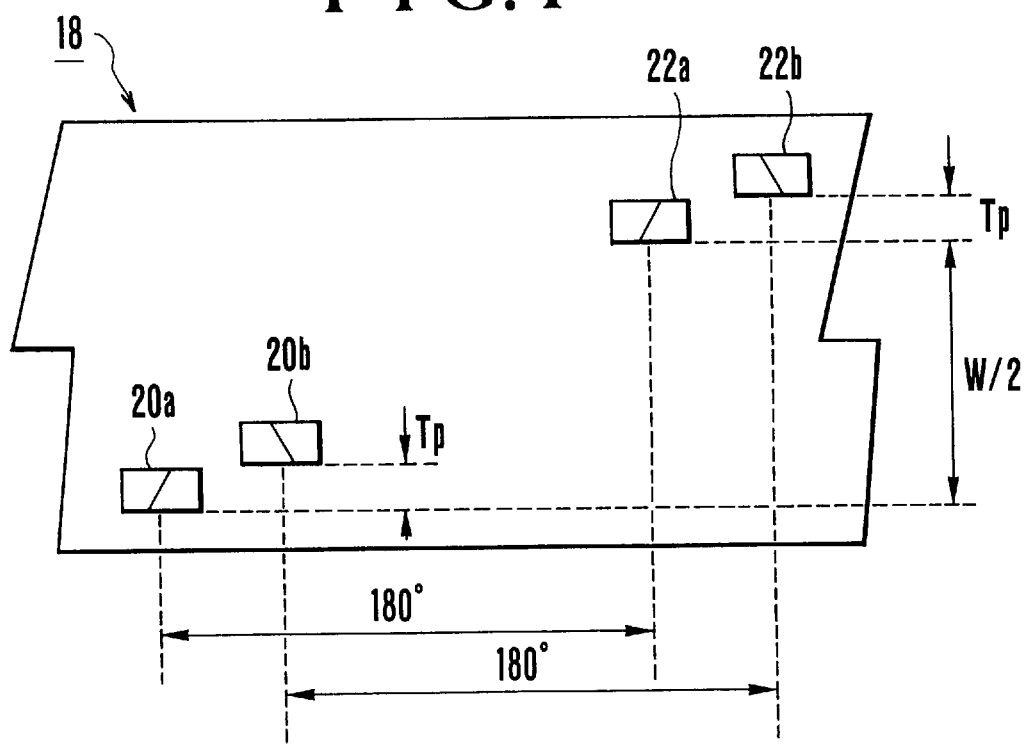
FIG. 4 is a schematic illustration of the location of heads on the circumferential surface of the rotary drum 18 shown in FIG. 3.

FIG. 3 is a schematic plan view showing a rotary head and a magnetic-tape cassette in the second embodiment of the present invention, and FIG. 4 is a developed view of the rotary head, taken in the circumferential direction thereof. A tape cassette 10 has two reels 12 and 14 and a magnetic tape 16 wound therearound. A rotary drum 18 is provided with magnetic heads 20a, 20b and 22a, 22b. The magnetic heads 20a and 20b have respective different azimuth angles, and the magnetic heads 22a and 22b also have respective different azimuth angles.

As can be seen from FIG. 4, the magnetic head 20a and the magnetic head 22a are spaced 180° apart from each other around the circumferential surface of the rotary drum 18. Similarly, the magnetic head 20b and the magnetic head 22b are spaced 180° apart from each other around the circumferential surface of the rotary drum 18. The magnetic heads 20a, 20b and the magnetic heads 22a, 22b are secured to the circumferential surface of the rotary drum 18 in different positions which are spaced apart by a height equivalent to approximately half a width W of the magnetic tape 16. With this arrangement, it is possible to read concurrently information recorded in two areas on the magnetic tape 16 which are formed along the width thereof, as will be described later in more detail. In the shown embodiment, the magnetic heads 20a and 20b and also the magnetic heads 22a and 22b are respectively secured in positions which are spaced apart by a track pitch Tp on the circumferential surface of the rotary drum 18. However, the magnetic heads 20a and 20b as well as the magnetic heads 22a and 22b may be secured in positions of the same height.

Figure 5:
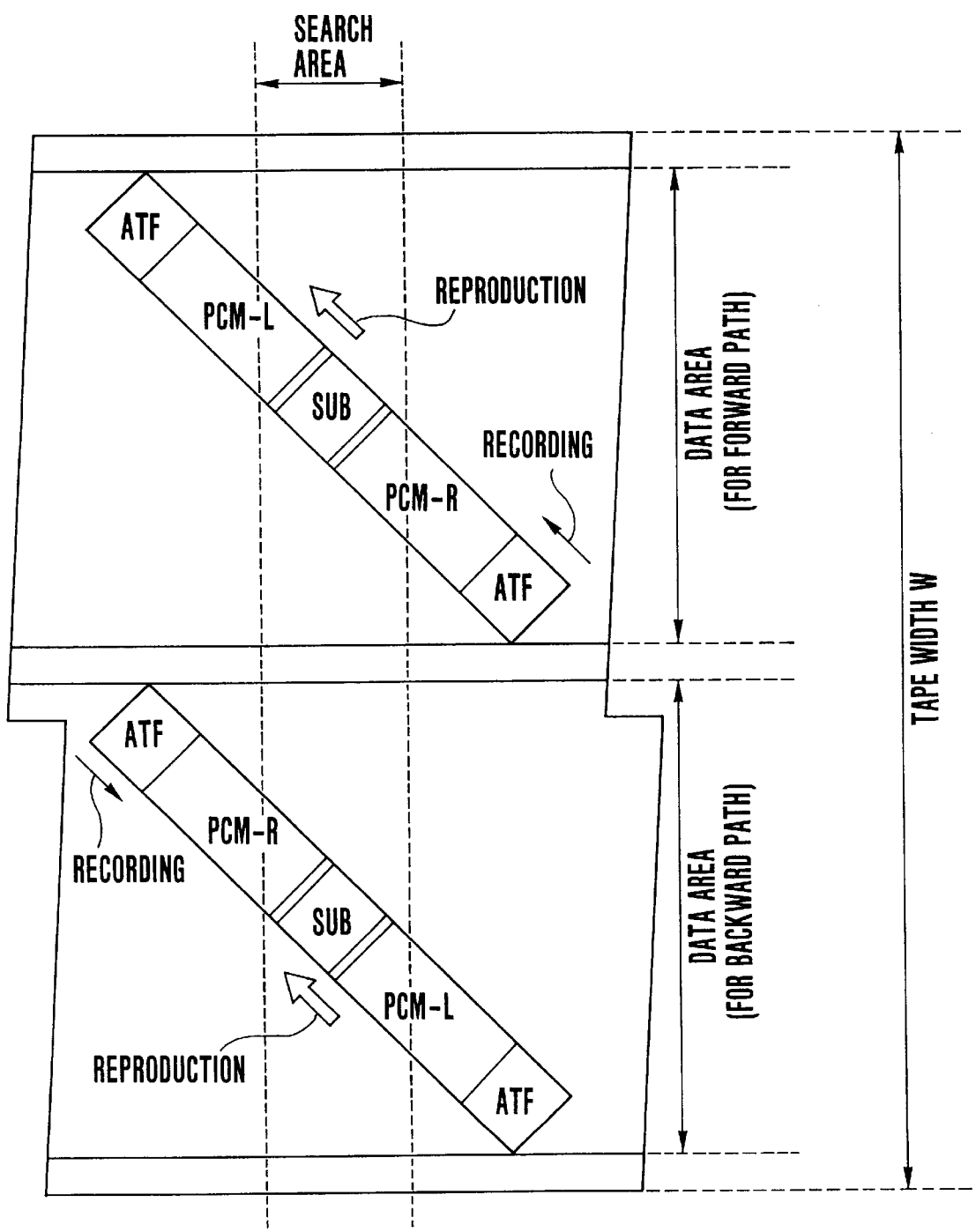
FIG. 5 is a schematic illustration showing data track patterns on a magnetic tape which are scanned by the rotary head system shown in FIG. 3.

FIG. 5 schematically shows track patterns formed on the magnetic tape 16. The recording surface of the magnetic tape 16 is divided into two parts along the tape width thereof, a data area for a forward path and a data area for a backward path. In the data area for a forward path and the data area for a backward path, each data track is formed by magnetic heads which are similar to the magnetic heads 20a, 20b, 22a and 22b shown in FIGS. 3 and 4. By recording data according to such track patterns, it is possible to perform recording and reproduction in forward and backward directions by means of a simple head arrangement such as that shown in FIGS. 3 and 4 without the need to reverse the tape cassette 10.

In FIG. 5, an area ATF is a recording area for an ATF pilot signal in an automatic track finding system, an area PCM-R is a recording area for a PCM signal which carries a right (R) signal for stereophonic sound, an area PCM-L is a recording area for a PCM signal which carries a left (L) signal for the stereophonic sound, and an area SUB is a recording area for search subdata. Each black arrow indicates the direction of head trace during recording, and each white arrow indicates the direction of head trace during reproduction. These signals are recorded in the order ATF, PCM-R, SUB, PCM-L and ATF as shown in FIG. 5. The aforesaid data tracks are described in more detail in "R-DAT Format", *Electronics Life* (January 1986) compiled by the Nippon Hōsō Shuppan Kyokai, pp.37–73.

Figure 6:
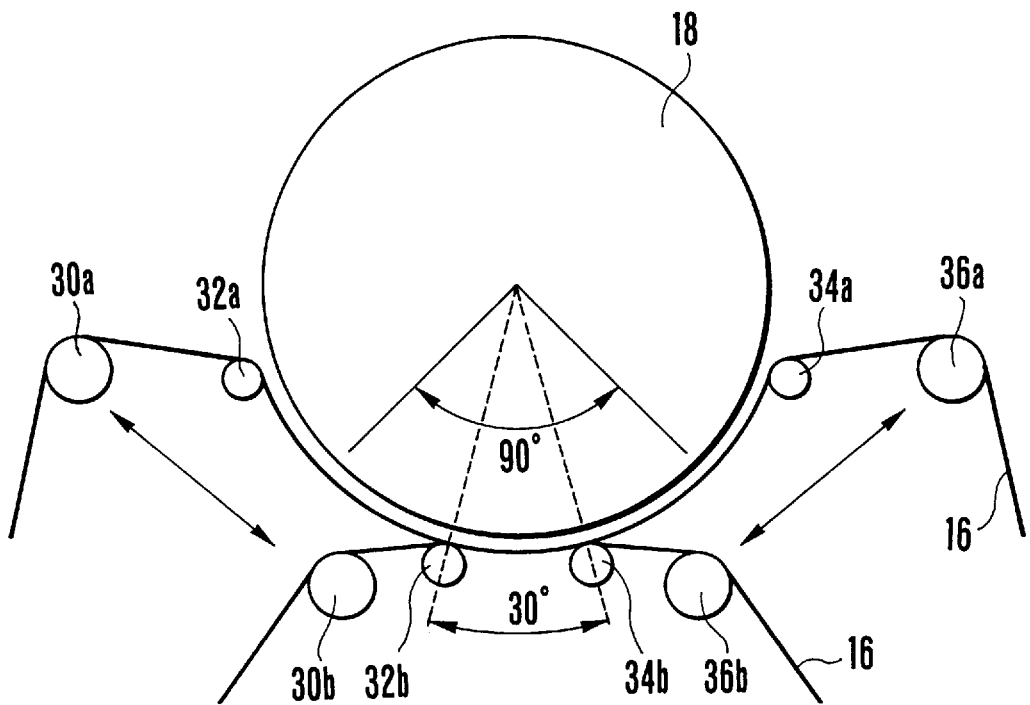
FIG. 6 is a schematic plan view of the state of wrapping of the magnetic tape with respect to the rotary drum 18.

In the case of a high-speed search, since only SUB areas may be reproduced, for example, the angle of wrapping of the magnetic tape 16 with respect to the rotary head 18 is preferably made small (for example, approximately 30°) to reduce the burden imposed on the magnetic tape 16, thereby enabling a higher-speed search. FIG. 6 is a schematic plan view showing the state of wrapping of the magnetic tape 16 with respect to the rotary drum 18. Reference numerals 30a, 30b; 32a, 32b; 34a, 34b; and 36a, 36b denote movable posts for controlling the loading or wrapping of the magnetic tape 16 around the rotary drum 18. When the entire recording area is to be reproduced, these movable posts move to the positions indicated by reference numerals 30a, 32a, 34a and 36a, thereby setting the angle of wrapping of the magnetic tape 16 with respect to the rotary drum 18 to approximately 90°. In the case of the high-speed search, the movable posts move to the positions indicated by reference numerals 30b, 32b, 34b and 36b, thereby setting the angle of tape wrapping to approximately 30°.

Figure 7:
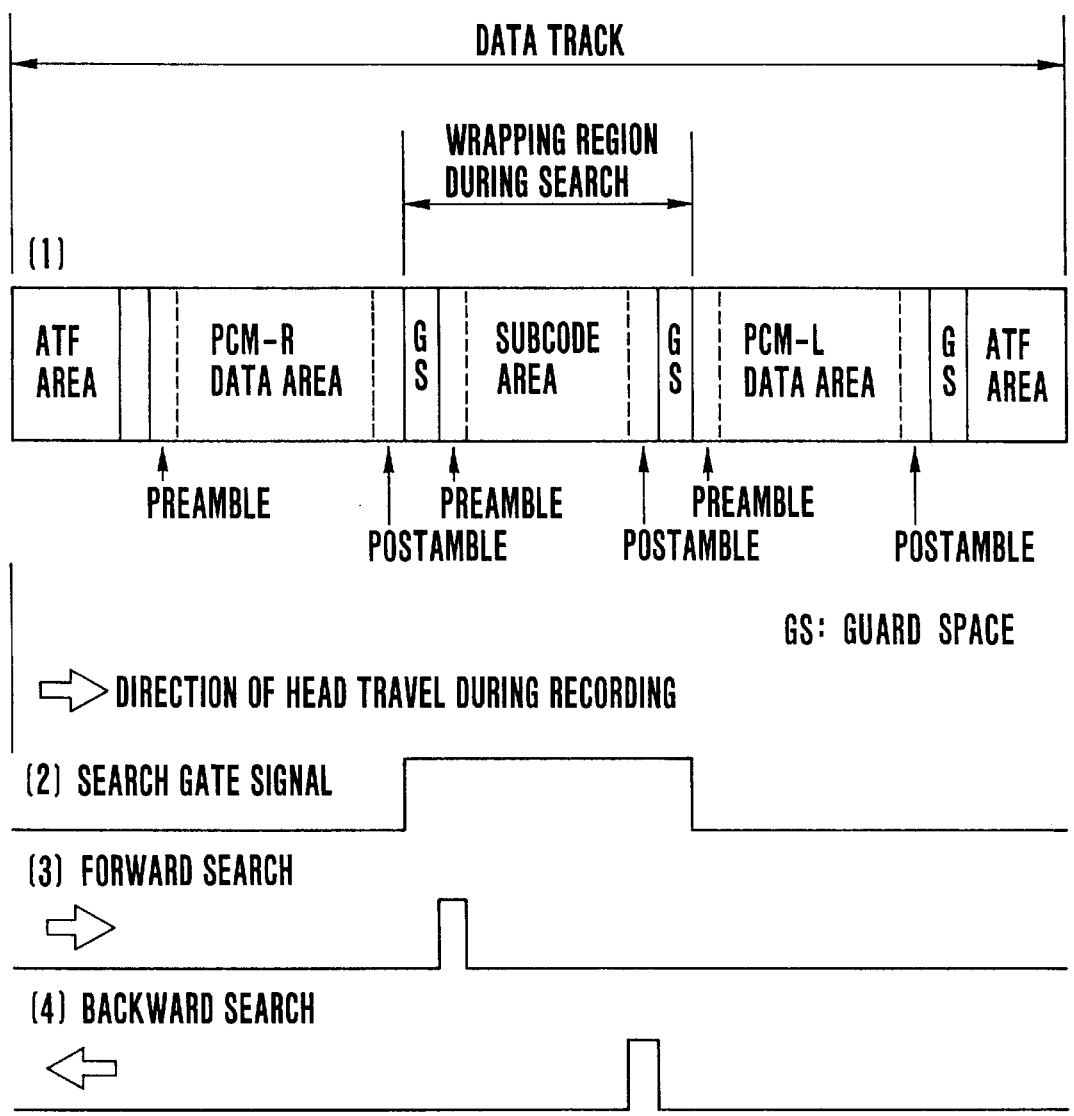
FIG. 7 is an illustration showing the arrangement of a data track and the timing of reproduction processing for the data track.

FIG. 7 shows the details of one of the data tracks and a timing chart of reproduction processing for the data track. Guard spaces are provided between every area so that recording and reproduction on and from each individual area can be performed. For example, so-called postrecording which updates either one of the PCM-R and PCM-L areas is also possible, and it is also possible to perform cueing of music by rewriting only the subcode area after the music has been recorded. A preamble and a postamble are respectively provided before and after each data area, and the preamble and the postamble are utilized to establish a PLL (phase-locked loop) required to generate a clock which serves as an operational reference for digital processing for data detection. Part (1) of FIG. 7 shows the details of the data track; part (2), a search gate signal for extracting the subcode from the SUB area; part (3), a gate signal for forward search to establish the PLL; and part (4), a gate signal for backward search.

A data detecting operation performed when the magnetic head traces in a direction opposite to the direction of head trace during recording will be described below with illustrative reference to the subcode area. Normally, after the establishment of the PLL has been completed during the preamble, a data sync is detected. The data sync is a digital sync signal for specifying a leading bit which determines timing to start a data-block reading operation. The data sync is a signal of from more than ten bits to some tens of bits, and consists of a bit pattern the frequency of appearance of which is extremely low (or which does not appear in main data). After the data sync, data and correcting data are reproduced.

Figure 8:
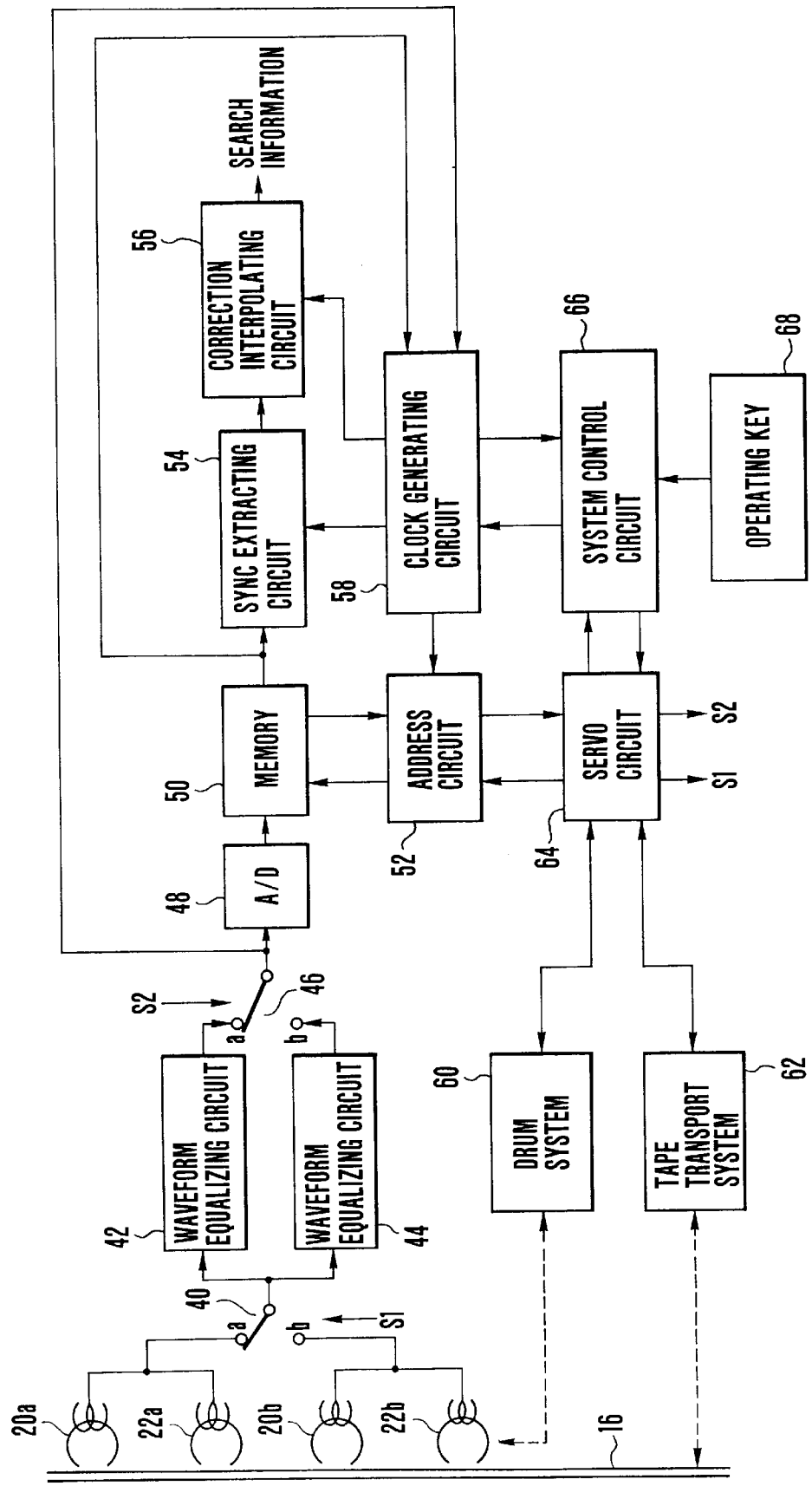
FIG. 8 is a schematic block diagram of the construction of a reproducing circuit according to the second embodiment.

FIG. 8 is a schematic block diagram of the construction of a reproducing circuit according to the second embodiment. In FIG. 8, the same reference numerals are used to denote constituent elements which are substantially identical to those shown in FIGS. 3 and 4. In the second embodiment, the magnetic heads 20a and 22a and also the magnetic heads 20b and 22b are secured to the rotary drum 18 with a 180° spacing, while the magnetic tape 16 is wrapped around the rotary drum 18 by 90°. Accordingly, the magnetic heads 20a and 22a or the magnetic heads 20b and 22b do not come into simultaneous contact with the magnetic tape 16. In the second embodiment, therefore, the outputs of the magnetic heads 20a and 22a and also the outputs of the magnetic heads 20b and 22b are directly coupled to each other, and are taken out from the rotary drum 18 through a common rotary transformer (not shown).

The reproducing circuit shown in FIG. 8 also includes a head selecting switch 40 for selecting the output from the magnetic heads 20a and 22a or the output from the magnetic heads 20b and 22b, and waveform equalizing circuits 42 and 44 for shaping a waveform supplied selectively from the magnetic heads but degraded by an electromagnetic conversion system utilizing a magnetic tape. Each of the waveform equalizing circuits 42 and 44 is a kind of filter circuit, and the waveform equalizing circuit 42 is assigned a filter coefficient which is optimized for the processing of performing reproduction in the same direction as recording, while the waveform equalizing circuit 44 is assigned a filter coefficient which is optimized for the processing of performing reproduction in a direction opposite to that of recording. A switch 46 selects the output of the waveform equalizing circuit 42 or 44.

The reproducing circuit of FIG. 8 also includes an A/D converter 48 for converting the output of the switch 46 into a digital signal, a memory 50 for storing the output data of the A/D converter 48, an address circuit 52 for generating a write address and a read address for the memory 50, a sync extracting circuit 54 for extracting the above-described data sync from the data read from the memory 50, a correction interpolating circuit 56 for correcting an error in accordance with an error correction code and interpolating an uncorrectable portion, and a clock generating circuit 58 for generating a clock signal to serve as a reference for a reproducing operation.

The reproducing circuit of FIG. 8 also includes a drum system 60 consisting of a motor for rotating the rotary drum 18 and a circuit for detecting the rotational speed and phase of the motor, a tape transport system 62 consisting of elements such as a capstan for causing the magnetic 16 to travel, a servo circuit 64 for controlling the drum system 60 and the tape transport system 62 as well as the switching of each of the switches 40 and 46, a system control circuit 66 for controlling the entire apparatus, and an operating key 68 for inputting various instructions into the system controlling circuit 66.

The operation of the reproducing circuit of FIG. 8 during search will be described below with reference to the timing chart of FIG. 9. The servo circuit 64 generates a drum rotation phase signal (part (1) of FIG. 9) whose one cycle corresponds to one rotation of the rotary drum 18, in accordance with a signal outputted from a drum PG (phase-detecting-signal generating circuit) in the drum system 60. In FIG. 9, each of "forward" and "backward" periods correspond to a half cycle. The servo circuit 64, via the output signal S1, also controls the switch 40 to select the output of the magnetic head 20a or 20b for a forward path during the "forward" period and the output of the magnetic head 22a or 22b for a backward path during the "backward" period.

A reproduced signal selected by the switch 40 is waveform-equalized by the waveform equalizing circuits 42 and 44. The switch 46 is normally connected to a contact a to select the output of the waveform equalizing circuit 42. During searching, the servo circuit 64, via the output signal S2, switches the switch 46 alternately between the contact a and a contact b in accordance with the "forward" period and the "backward" period of the drum rotation phase signal of part (1) of FIG. 9. With this operation, the reproduced signal from the data area for the forward path is optimally waveform-equalized by the waveform equalizing circuit 42, while the reproduced signal from the data area for the backward path is optimally waveform-equalized by the waveform equalizing circuit 44, and the optimally waveform-equalized signal is selected by the switch 46.

The signal selected by the switch 46 is converted into a digital signal by the A/D converter 48, and the digital signal is sequentially written into the memory 48 in accordance with write addresses generated by the address circuit 52. The address circuit 52 generates an address signal for the memory 50 by making reference to time information supplied from the servo circuit 64, and controls writing and reading operations. Since the reproduced outputs from the respective magnetic heads 20a, 22a, 20b and 22b are sequentially supplied at intervals of 180°, writing (W) to the memory 50 is performed in the first 90° of each 180° interval and reading (R) from the memory 50 is performed in the second 90° (refer to part (2) of FIG. 9). The signal from the data area for the forward path is read in accordance with forward read addresses (count-up similar to address counting in writing) as shown in part (3) of FIG. 9, whereas the signal from the data area for the backward path is read in accordance with backward read addresses (count-down) as shown in part (4) of FIG. 9. With this operation, the array of the reproduced data from the data area for the backward path can be modified to an array in the forward direction.

In the above-described manner, the data read from the memory 50 is supplied to the sync extracting circuit 54, where a digital sync signal is detected, and the correction interpolating circuit 56 performs error correction and interpolation in a known manner.

The establishment of a PLL performed in the PLL clock generating circuit 58 will be explained below in brief. If the establishment of the PLL is to be performed by analog processing, the respective signals in preambles along the forward path and postambles along the backward path are extracted from the output signal of the switch 46 in accordance with the gate signals shown in parts (3) and (4) of FIG. 7, and the extracted signals are appropriately switched and applied to a reference oscillator (not shown), thereby effecting establishment of a frequency and a phase. If the establishment of the PLL is to be digitally performed, the respective signals in the preambles along the forward path and the postambles along the backward path are extracted from the output of the memory 50, and an establishing operation is performed.

In the above-described second embodiment, the conversion of the data array of the reproduced data from the backward path is realized by counting down the read addresses. However, of course, the order of change of write addresses may be reversed and the read addresses may be changed in the same order as the data array of the reproduced data from the forward path.

As is readily understood from the foregoing description, in accordance with the second embodiment, it is possible to reproduce and output searched data concurrently in both the forward and backward directions.

What is claimed is:

1. A reproducing apparatus for reproducing data including first data and second data from a tape-shaped recording medium, the first data having been recorded in a first area of the tape-shaped recording medium transported in a first transporting direction by a rotary head rotating in a first rotation direction and the second data having been recorded in a second area of the tape-shaped recording medium transported in a second transporting direction opposite to the first transporting direction by a rotary head rotating in a second rotation direction opposite to the first rotation direction, said apparatus comprising:

(a) reproducing means having a rotary head and transporting means for transporting the tape-shaped recording medium, said reproducing means reproducing both the first and second data from the tape-shaped recording medium transported by said transporting means in the first transporting direction by the rotary head rotating in the first rotation direction;

(b) memory means for storing the first and second data reproduced by said reproducing means;

(c) reading means for reading the first and second data from said memory means and outputting the first and second data; and (d) control means for controlling an operation of said reading means so as to output the first data in a same order as an order of the first data to be stored in said memory means and to output the second data in an opposite order to an order of the second data to be stored in said memory means.

2. An apparatus according to claim 1, wherein the first and second data include image data.

3. An apparatus according to claim 2, wherein said first and second data include subcode data for searching the image data in the first and second data.

4. An apparatus according to claim 1, wherein said reproducing means includes an equalizer for equalizing the first and second data reproduced from the recording medium, said memory means storing the first and second data equalized by said equalizer to said memory means.

5. A reproducing apparatus for reproducing data including first data and second data from a recording medium, the first data having been recorded in a first area of the recording medium transported in a first transporting direction by reproducing element scanning in a first scanning direction and the second data have been recorded in a second area of the recording medium transported in a second transporting direction opposite to the first transporting direction by a scanning element scanning in a second rotation direction opposite to the first scanning direction, said apparatus comprising:

(a) reproducing means having a reproducing element and transporting means for transporting the recording medium, said reproducing means reproducing both the first and second data from the recording medium transported by said transporting means in the first transporting direction by the reproducing element scanning in the first direction;

(b) memory means for storing the first and second data reproduced by said reproducing means;

(c) reading means for reading the first and second data from said memory means and outputting the first and second data; and (d) control means for controlling an operation of said reading means so as to output the first data in a same order as an order of the first data to be stored in said memory means and to output the second data in an opposite order to an order of the second data to be stored in said memory means.

* * * * *